July 18, 1944.  M. M. MUNK  2,354,042
LONGITUDINALLY CONTROLLABLE AIRFOIL
Filed May 1, 1937  2 Sheets—Sheet 1
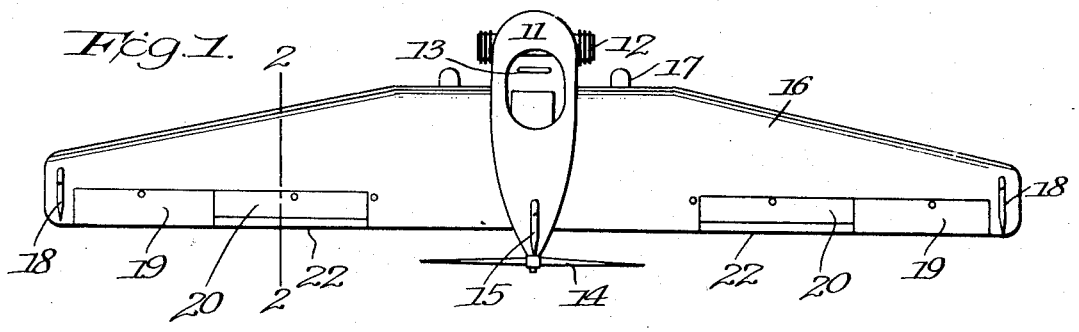
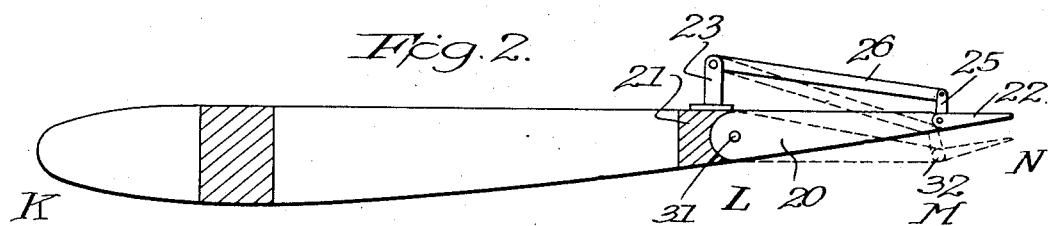
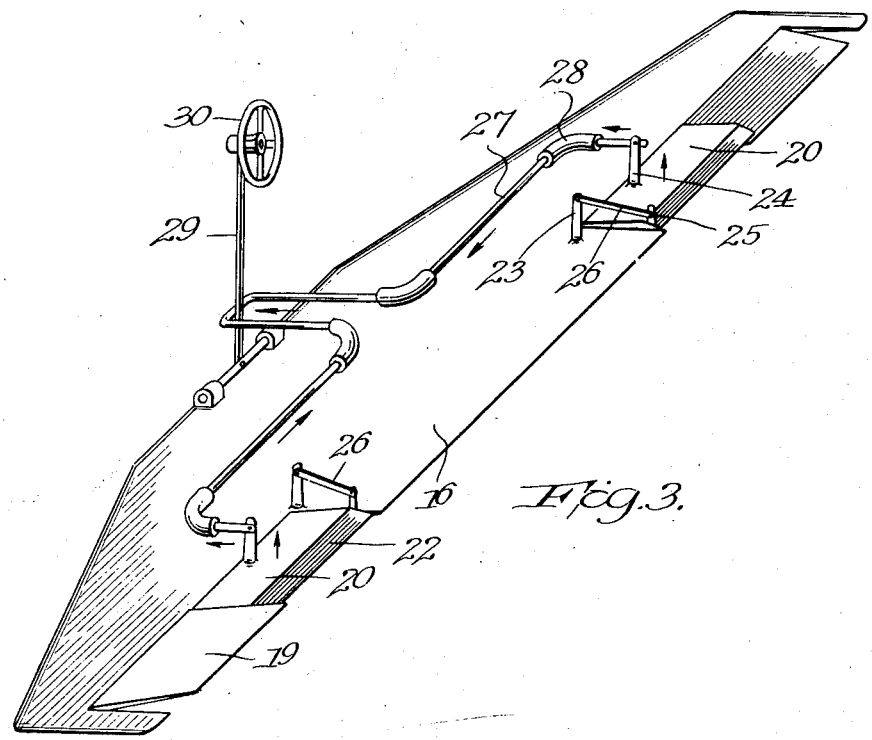
Inventor
Max M. Munk July 18, 1944.   M. M. MUNK   2,354,042
LONGITUDINALLY CONTROLLABLE AIRFOIL
Filed May 1, 1937    2 Sheets-Sheet 2
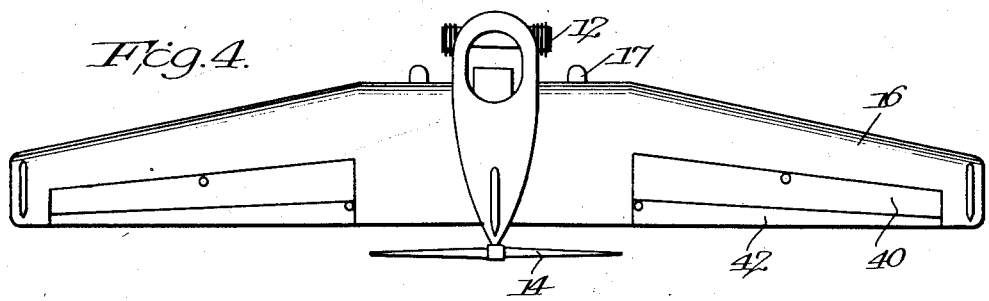
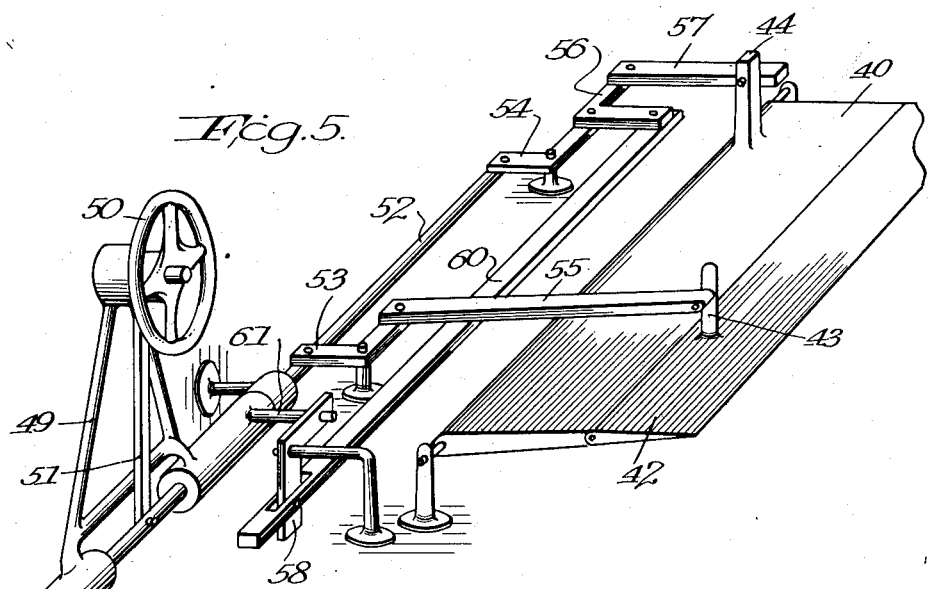
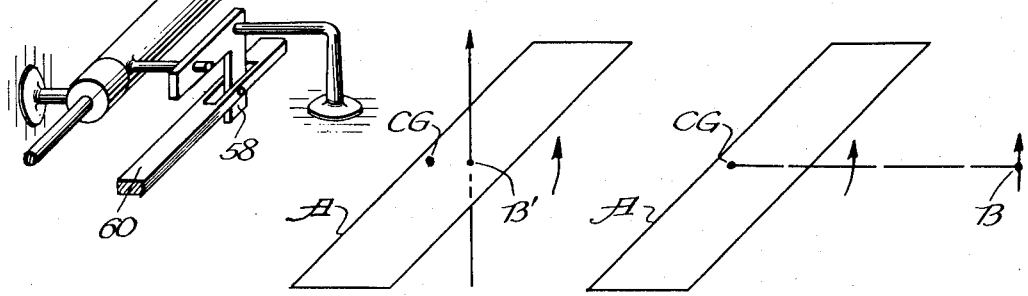
Inventor
Max M. Munk Patented July 18, 1944

2,354,042

UNITED STATES PATENT OFFICE 2,354,042

LONGITUDINALLY CONTROLLABLE AIRFOIL

Max M. Munk, Cottage City, Md.

Application May 1, 1937, Serial No. 140,238

2 Claims. (Cl. 244—13)

This invention relates to an airfoil, or to a composite major lifting member of a heavier-than-air craft, in which there are incorporated means for the longitudinal control of the aircraft. It relates particularly to such airfoils or systems of airfoils of tailless airplanes which are short and compact in longitudinal direction. With biplanes or multiplanes this implies that the several airfoils are in substantially vertical relation to each other, there being no tandem arrangement and no pronounced stagger between the several airfoils. In any case this implies that the wing tips are in substantially lateral relation to the wing centers, there being no pronounced sweepback.

Such airfoils or systems of airfoils, with the longitudinal control incorporated therein, heretofore known, have the following defect: that the vertical aerodynamic control force brought into being by the manipulation of the longitudinal control means intersects with the airfoil, and hence acts on a comparatively short lever arm; the latter being the distance between the line of action of said force and the center of gravity of the aircraft. With conventional tail control, the control force acts near the elevator axis, and the effective lever length is therefore equal to the distance of the center of gravity from that axis. This is in general two to three times the length of the mean chord of the airfoil. With tailless airplanes employing airfoils without very pronounced sweepback, and in absence of special provisions for the elimination of excessive control lift, as proposed in this specification, the control force would naturally act along a line intersecting with the airfoil. This would make the effective lever arm equal to a fraction of the wing chord, and hence reduce it to about a third or even a smaller fraction of the lever length found satisfactory in conventional airplane design. In other words, with such tailless airplanes, the production of any longitudinal control moment of predetermined magnitude is associated with the creation of a comparatively large vertical control force, the magnitude of this force being inverse to the length of the effective lever. This is bad, because the efforts of the pilot to keep his aircraft on a straight flight path will then be defeated by the very control forces which he produces to bring this about.

Conditions are aggravated by the fact that the lever arm in question extends ordinarily to the rear of the center of gravity. The resultant control force acts not only too close to the center of gravity, it does so in rear of it. Hence the creation of a diving moment (say) is associated with the production of an upward control force, and vice versa. The control force is therefore seen to be in the opposite direction as the desired change of the motion of the aircraft. It is, in this sense, counteracting. For instance, if it is desired to dive, the control force necessary to bring this about is directed upward, and imparts an upward motion to the aircraft; and only after this has taken effect, the simultaneous control moment will pitch the aircraft into the nose-down direction, which in turn finally gives rise to a diminished lift, after the lift has first been increased. This alternation of positive and negative lift increase results in undesirable flight and maneuvering properties, as follows logically from this argument, and has again and again been found with tailless airplanes constructed and flown.

The present invention entails the discovery of the cause of this defect, and resides in the design features suitable for removing the same. According to the invention, the air foil has incorporated therein control means specifically designed to produce reasonably small control forces or none at all in the association with the production of a predetermined control moment. That is to say, the control force acts at a reasonably large distance from the center of gravity. The purpose of the invention can thus be said to consist in the elimination of an excessive vertical control force, more particularly of a counteracting one, in a longitudinally self-controllable airfoil. Or, again, the invention can be said to consist in incorporating in such airfoil longitudinal-control means characterized by the absence of a short lever arm of the vertical control force, more particularly in rear of the center of gravity, of a lever arm shorter than the mean wing chord or not much longer.

According to the invention, this is accomplished by the proper shaping, dimensioning, and displacing the control means, making the elimination of an excessive control lift a guiding design principle in the determination of all dimensions and ratios of the control means and their motions. In the preferred embodiment, the control means consist of tabbed flaps placed along a portion of the trailing edge of the airfoil. The invention resides then in so coordinating the flap and the tab dimensions and the relation between the angular flap displacement and the angular tab displacement that the above outlined condition is complied with.

It is accordingly the object of the present invention to provide for an airfoil system with longitudinal control means lodged therein, in which excessive vertical control forces are eliminated.

It is another object to provide for longitudinal-control means lodged in an airfoil, adapted to produce a longitudinal-control force acting fore or aft spaced from the airfoil.

It is another object to provide for a tailless airplane with an airfoil having tabbed flaps, or multiple flaps, for longitudinal control.

It is another object to provide airfoils with tabbed flaps for longitudinal control, the effective lever arm of which is larger than the mean chord of the airfoil.

These, and other desirable objects and advantages of the present invention will be illustrated in the accompanying drawings and described in the specification, certain preferred embodiments being disclosed by way of illustration only, for, since the underlying principles may be incorporated in other specific devices, it is not intended to be limited to the ones here shown, except as such limitations are clearly imposed by the appended claims.

In the drawings, like numerals refer to similar parts throughout the several views, of which Fig. 1 represents the top view of an airplane incorporating the invention, Fig. 2 shows the cross-section through a wing of that airplane taken along the line 2—2, Fig. 3 is a perspective schematic plan of the longitudinal-control mechanism of the same airplane, Fig. 4 represents the top view of an airplane similar to the one shown in Fig. 1, incorporating the invention in a modified manner, Fig. 5 is a perspective schematic plan of the longitudinal and lateral control mechanism of this latter airplane, Fig. 6 is a diagram, representing the line of action of the control force intersecting with the airfoil, and Fig. 7 is a similar diagram, representing the line of action of the control force not intersecting with the airfoil, but spaced therefrom.

In Fig. 1 there is represented a fuselage 11, engine 12, control wheel 13, pusher propeller 14, fin 15, airfoil 16, landing gear 17, rudders 18, ailerons 19, a pair of flaps 20 hinged to the rear spar 21 of wings 16, a pair of tabs 22 hinged to flaps 20. As shown in greater detail in Figs. 2 and 3, there are provided horns 23, fastened stationary on rear spar 21, horns 24 mounted on the axle of flaps 20, and horns 25 mounted on the tabs 22. Rods 26 link horns 23 to horns 25. Tension and compression transmission members 27, guided, where necessary, in the guide members 28, link horns 24 to control mast 29. Handwheel 30 on control mast 29 is operatively connected to ailerons 19 in any conventional manner, not shown in the drawings, as there is nothing new about that feature. 31 indicates the flap axis at which flap 20 is hinged to airfoil 16. 32 indicates the tab axis at which tab 22 is hinged to flap 20.

In airplane Fig. 4 there are no separate ailerons, but flaps 40 and tabs 42 serve selectively as ailerons and for longitudinal control. Handwheel 50, by means of lever 51 fastened thereon and hinged to aileron push rod 52, turns bell cranks 53 and 54 mounted on the stationary wing structure of airfoil 16. Rod 55 transmits the motion from bell crank 53 to tab horn 43 and thus to tab 42.

Bell crank 54 has mounted on its outer end a third bell crank 56, the outer end of which is linked to flap horn 44 by means of rod 57. Control mast 49, when tilted about the axis of rod 52, turns flap 40, by means of levers 61 engaging one end of bell cranks 58 mounted on the stationary wing structure, and of longitudinal push rods 60 linking the outer end of crank 58 to the end of bell crank 56, the other end of which is linked to horn 44 by means of rod 57. Push rod 52 extends from one side of the airfoil to the other, so that both outer ends of the same always move in the same direction. The pair of push rods 60 move counterwise, the one from outside to inside, the other oppositely. In consequence, the rotation of hand wheel 50 turns one flap with its tab up and at the same time the other flap with its tab down. Tilting of control mast 49 turns either both flaps up or both down. Tabs 42 are then also moved in a peculiar manner relative to the rigid wing structure, and relative to the flaps, as shown in Fig. 2 with flaps 20 and tabs 22. The horn length of 23 and 25 and the length of rod 26 is so proportioned that the incidence angle between the new and the original position of flap 20 is equal but opposite to the incidence angle between the new and the original position of tab 22. Thus an elevator effect is obtained as has now to be discussed more in detail, as this elevator effect or longitudinal-control effect goes to the essence of the invention.

The turning of either hand wheel 30 or 50 brings about the ordinary aileron motion and its effect, which are not claimed per se. The invention centers about the tilting of control masts 29 or 49, without turning of wheels 30 or 50. This produces a change or modification of the shape or configuration of airfoil 16, being in this case essentially a modification of the inclination or incidence of portions of the same, namely of the flaps 20 or 40, and of the tabs 22 or 42. This change again produces a change or modification of the air forces acting on airfoil 16. The magnitude of this change can be predicted by the use of engineering methods publicly available and known, and adopted by the profession. Reference is made for these methods to:

Munk: Fluid Dynamics for Aircraft Designers. N. Y. 1929 (Ronald Press Co.).

Perring: The Theoretical Relationships for an Aerofoil with a Multiple Hinged Flap System. R. & M., No. 1171, British A. R. C., 1928. (H. M. Stationary Office.)

N. A. C. A. Technical Reports No. 142, 191. (Munk.)

N. A. C. A. Technical Report No. 574. (Wenzinger.)

Experimental information on the effect of displacing hinged or otherwise movable portions of an airfoil relative to the same is amply available, among other published by the N. A. C. A. The experiments confirm on the whole the theoretical methods and predictions, and give aid in applying the theory intelligently.

Using all information, but preferably the theoretical method, it is possible to compute the air forces produced by the manipulation of any control system, and to figure out the dimensions and displacements of a control system necessary for obtaining desired control forces, namely a certain predetermined control force acting along a certain predetermined line. The relation between structural characteristics and airforces, although complicated, is readily ascertainable, so that a limitation regarding the latter constitutes likewise a limitation regarding the former.

The special limitation to be used for pointing out the present invention is illustrated by Figs. 6 and 7, where A represents the leading edge of an airfoil, CG the center of gravity of the aircraft, B' and B the centers of pressure of the longitudinal-control force called into existence by the manipulation of the longitudinal control. Fig. 6 shows this force to act along a line intersecting with the airfoil, whereby the effective lever length CG—B' is small, smaller than the mean wing chord, and the control force is accordingly large. Fig. 7 shows the force to act along a line behind the airfoil, and behind every portion thereof, not intersecting with the airfoil, but spaced longitudinally apart from it. That is to say, the center of pressure of the longitudinal control force is positioned either in front of the most forward point of the airfoil, or behind the most rearward point thereof. Hence, in this sense, it is longitudinally spaced apart or spaced from the airfoil.

In the special case of the longitudinal-control means of Figs. 1 and 4, where there is one pair of tabbed flaps, the flap hinged onto and behind the wing, and the tab hinged onto and behind the flap, the relation between the dimensions and displacements in conjunction, and the airforces on the other hand, can be determined by the repeated use of two curves to be designated in this specification as curve I and curve II for shortness. Both curves are found in N. A. C. A. T. R. No. 574, diagram Fig. 11; curve I is there designated by $$-\frac{\partial d}{\partial \delta_f}$$

and curve II is there designated by $$-\frac{\partial C_m}{\partial \delta_f}.$$

These curves relate to one hinge only. The effect of two hinges is obtained by considering each hinge separately and adding up their effects. This is represented by Equations 1 and 2 of said T. R. 574. The same method can also be used for a larger plurality of hinges.

Two curves are necessary, because the control effect has two aspects, force and moment. According to the invention, the position of the hinges and the angular relative deflections of tabs and flaps are so chosen, that the theoretical lift, given by the application of said curve I becomes reasonably small. In other words, the control displacement is so chosen that the left theoretically produced by the angular motion at the front hinge, called flap hinge, cancels or neutralizes to a reasonable degree the lift produced by a similar angular turn at the rear or tab hinge. The extent of this cancelling of the lift is determined by the condition, that the moment theoretically produced divided by the lift produced gives a length exceeding (say) the airfoil chord. The lift may entirely cancel out. The moment computed by said curve II will then not in general cancel to a similar extent, but comparatively large moments and small lifts can be obtained.

Such combination is for instance a flap hinged at 72% of the chord and a tab hinged at 94% of the chord, with the angle between flap and wing one half of and opposite to the angle between flap and tab, as shown in Fig. 2. Angle K—L—M is one half of angle L—M—N. Curve I gives for that condition the value ".64" for the front hinge, called there 28%, and ".32" for the rear hinge, called there 6%. But since the angular rear displacement is twice as large as the front displacement, and opposite, the latter value .32 has to be multiplied by the factor 2 and then to be subtracted from the former value .64. This cancels exactly; hence, theoretically, there will not be created any lift, and practically, only a small control force will be created. The corresponding moment values obtained from curve II do not cancel under these conditions. The respective values read are .65 and .46, the latter doubled gives .92, and this does not cancel —.65, but leaves a sufficient control moment. This theoretical result would never be obtained with one flap only. In the two-dimensional case, the distance of the theoretical center of control from the 25% station produced by the deflection of one flap is obtained by dividing the ordinate of curve II by that of curve I and by $2\pi$, and multiply the result by the chord. It results that the center is always between 25% and 50%.

The actual center may be slightly different from this theoretical center for small flying and displacement angles, and more so for large angles. It is not strictly ascertainable beforehand. The theoretical center is on the contrary exactly ascertainable for any given structure, by the use of purely mathematical engineering computations. Only structural lengths enter into this computation, hence the computation outcome is itself a structural length.

In case of a sweepback of the wings, the moments of the control lift, if any, about a lateral axis through the center of gravity have also to be considered. Each individual control lift has to be multiplied by its longitudinal distance from the center of gravity, and these products added up.

I claim:

1. In a tailless airplane, in combination, an inherently longitudinally stable wing, a longitudinal control surface mounted for vertical angular displacement relative to said wing for developing pitching moments acting in the desired direction to longitudinally control the airplane, an adverse lift neutralizing surface mounted for vertical angular displacement relative to said wing to adjusted positions relative to the control positions of said longitudinal control surface, respectively, for neutralizing adverse lift developed by said control surface, pilot operated control mechanism connected to said longitudinal control surface and to said adverse lift neutralizing surface, said pilot operated control mechanism being effective for angularly vertically displacing said longitudinal control surface to control positions and constructed and arranged whereby simultaneous displacement of said neutralizing surface in a direction opposite the direction of displacement of said longitudinal control surface is effected to thereby substantially reduce the adverse lift developed by said longitudinal control surface in any control position thereof throughout the operating range of said longitudinal control surface.

2. In a tailless airplane, in combination, a wing having such a chordwise section and constructed and arranged whereby it is inherently longitudinally stable, a longitudinal control surface mounted for vertical angular displacement relative to said wing for developing pitching moments acting in the desired direction to longitudinally control the airplane, an adverse lift neutralizing surface mounted for vertical angular displacement relative to said wing to adjusted positions relative to the control positions of said longitudinal control surface, respectively, for neutralizing adverse lift developed by said control surface, pilot operated control mechanism connected to said longitudinal control surface and to said adverse lift neutralizing surface, said pilot operated control mechanism being effective for angularly vertically displacing said longitudinal control surface to control positions and constructed and arranged whereby simultaneous displacement of said neutralizing surface in a direction opposite the direction of displacement of said longitudinal control surface is effected to thereby substantially reduce the adverse lift developed by said longitudinal control surface in any control position thereof throughout the operating range of said longitudinal control surface.

MAX M. MUNK.